Patented June 1, 1937

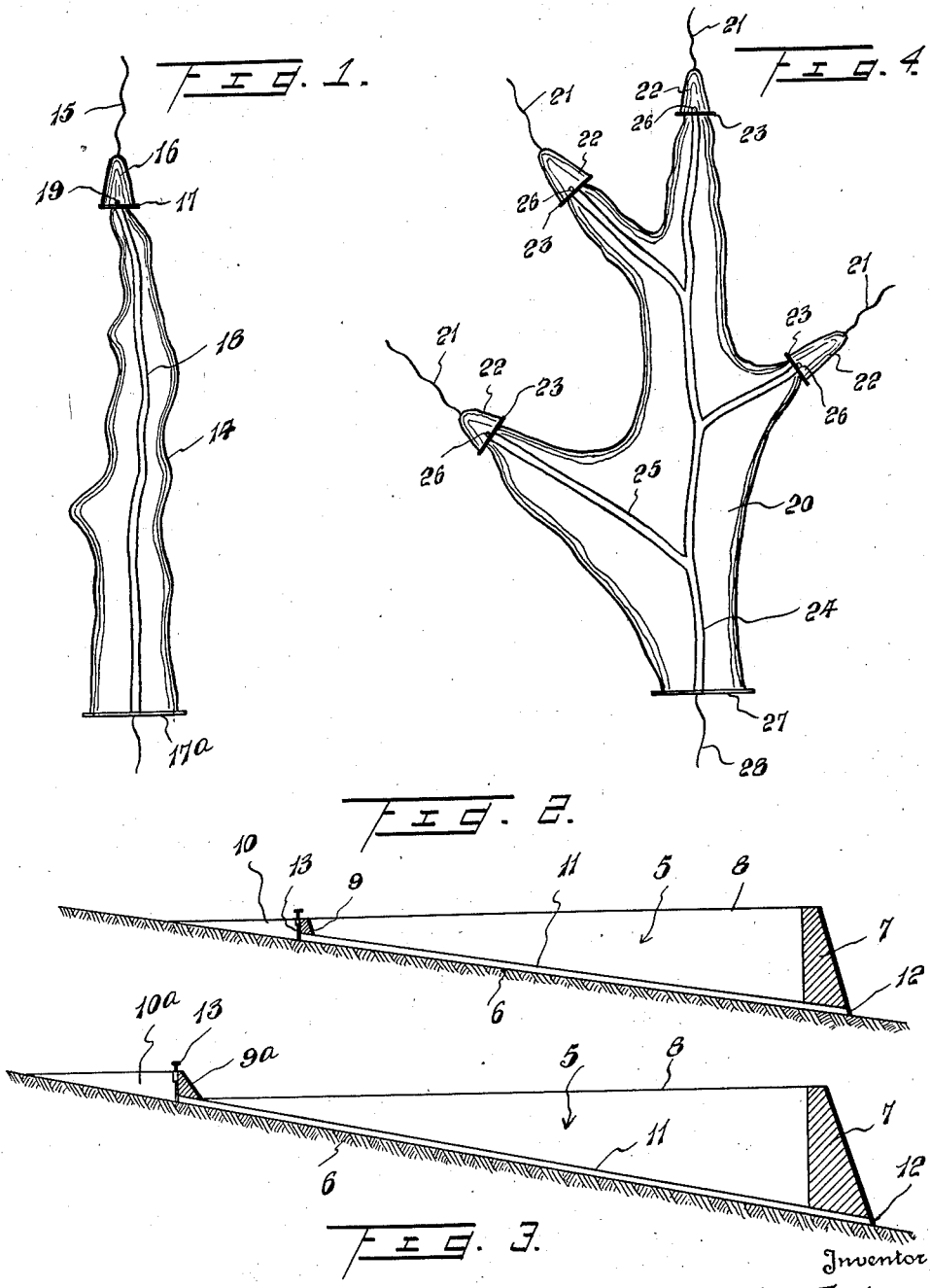

2,082,694

UNITED STATES PATENT OFFICE 2,082,694

SILT COLLECTOR FOR RESERVOIRS

Lyndon L. Foley, Tulsa, Okla.

Application January 9, 1936, Serial No. 58,384

1 Claim. (Cl. 61—2)

This invention relates to silt collector for reservoirs and the like.

In reservoirs and artificial lakes, the accumulation of silt is a serious problem which necessitates the draining of the lake or reservoir for cleaning purposes to remove the silt therefrom which is an expensive item in the use thereof with such cleaning operation placing the lake or reservoir out of use and further causing inconvenience.

The primary object of this invention is to construct a reservoir or the like in a manner to prevent the collection of silt therein so that the reservoir may remain continuously in use and the silt that is collected at the upper end of the reservoir and at the outer side thereof may be discharged downstream at will without entering the reservoir.

A further object of the invention is to provide a silt collecting device for reservoirs and the like in the form of a small auxiliary dam at the upper end or head of the reservoir to prevent entrance of silt into the reservoir but permitting the silt cleared water to overflow into the reservoir with a conduit on the bed of the reservoir opening at one end at the outer side of the auxiliary dam where the same is gate-valve controlled for the discharge of silt through the conduit that has its other end extending through the main dam and opening at the low side thereof.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of an artificial lake having a single river or stream inlet with dams at the upper and lower ends of the lake and showing a gate-valve controlled conduit on the bed of the lake between the two dams;

Figure 2 is a vertical longitudinal sectional view of a reservoir having the main and auxiliary dams at the lower and upper ends thereof showing the upper ends of the two dams lying in the same plane with a conduit on the bed of the reservoir having a control valve therefor at the upper auxiliary dam;

Figure 3 is a vertical longitudinal sectional view of a reservoir in which the upper end of the auxiliary dam is in a plane above the upper end of the lower main dam with the gate-valve controlled conduit; and Figure 4 is a plan view of an artificial lake having a plurality of river or stream inlets with a main dam at the lower end of the lake and an auxiliary dam associated with each inlet.

Referring more in detail to the accompanying drawing and particularly to Figure 2, the reference character 5 designates a reservoir having an inclined bed 6 and bordered by a main dam 7 at the lower end and side walls 8.

A smaller auxiliary dam 9 extends across the reservoir 5 at the upper end thereof and in spaced relation to said end to provide an auxiliary reservoir 10 for the collection of silt. The upper end of the auxiliary dam 9 lies in the plane of the upper ends of the side walls 8 and main dam 7 of the main reservoir 5 so that silt laden water that enters the auxiliary reservoir 10 has the silt removed therefrom with the cleared water overflowing the auxiliary dam 9 and entering the main reservoir 5.

To remove the collected silt from the auxiliary reservoir 10, there is provided a conduit 11 that rests on the inclined bed 6, the lower end of the conduit 11 extending through the base of the main dam 7 and opening at the lower side of said dam as shown at 12. The upper end of the conduit 11 extends through the auxiliary dam 9 at the base thereof for communication with the auxiliary reservoir 10 and said upper end of the conduit is normally closed by a gate valve 13 or the like. The auxiliary dam 9 prevents the entrance of silt into the main reservoir 5, the latter remaining at all times in a clean condition and the silt taken from the water that rapidly collects in the auxiliary reservoir 10 may be discharged at will by operating the gate valves 13 through the conduit 11 for discharge downstream at a point below the main dam 7.

In the form of invention illustrated in Figure 3, the auxiliary dam 9a has the upper end thereof lying in a plane above the upper end of the main dam 7 and side walls 8 so that the water level in the auxiliary reservoir 10a would be above the water level in the main reservoir 5, the water entering the auxiliary reservoir 10a having the silt removed therefrom and overflowing the dam 9a to enter the main reservoir 5. The main reservoir 5 has the conduit 11 resting upon the inclined bed 6 and extending through the main and auxiliary dams 7 and 9a with the upper end of the conduit 11 controlled by the gate-valve 13.

An artificial lake 14 is shown in Figure 1 as having a single river or stream supply or inlet 15. An auxiliary lake or reservoir 16 is formed at the upper end of the lake 14 into which the river or stream 15 flows and an auxiliary dam 17 is interposed between the reservoir 16 and the lake 14.

A main dam 17a is arranged at the lower end of the lake 14 and a conduit 18 resting on the lake bed extends between the auxiliary and main dams 17 and 18 respectively, the upper end of the conduit being controlled by a gate-valve 19 associated with the auxiliary dam 17.

The lake 20 shown in Figure 4 has a plurality of river or stream inlets 21, each inlet opening into an auxiliary reservoir 22 and an auxiliary dam 23 is interposed between each reservoir 22 and the lake 20. A main conduit 24 extends to the lake and has branch conduits 25 communicating with the auxiliary reservoirs 23, a control valve 26 being associated with each auxiliary dam 23. A main dam 27 is arranged in the lower end of the lake 20 through which the main conduits 24 extend and which is illustrated as being in communication with a single river or stream outlet 28.

The silt is removed from the water by the auxiliary dam before the water enters the lakes or main reservoir and the collected silt is discharged at will from the auxiliary reservoirs through the conduits that extend through the auxiliary and main dam so that the main reservoirs remain in a clean condition at all times.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

Means for preventing the entrance of silt into a reservoir comprising a main reservoir having an inclined bed, a main dam at the lower end thereof, an auxiliary smaller dam at the upper end, an auxiliary reservoir at the upper side of the auxiliary dam for the collection of silt from water flowing over the auxiliary dam into the main reservoir, a conduit on the inclined bed of the main reservoir having the lower end extending through the base of the main dam and the upper end extending through the base of the auxiliary dam and communicating with the auxiliary reservoir, the forward lower end of the conduit being unobstructedly open and a gate valve associated with the upper end of the conduit rearwardly of the auxiliary dam whereby the conduit is free of water and silt until the gate valve is open with the rush of water through the conduit from the auxiliary reservoir effectively carrying all silt therewith through the conduit in a down-stream direction beyond the main dam.

LYNDON L. FOLEY.